3,389,735
RETAINER ASSEMBLY
Jack Katz, 6630 W. Colgate Ave.,
Los Angeles, Calif. 90048
Filed July 17, 1967, Ser. No. 653,711
4 Claims. (Cl. 151—41.76)

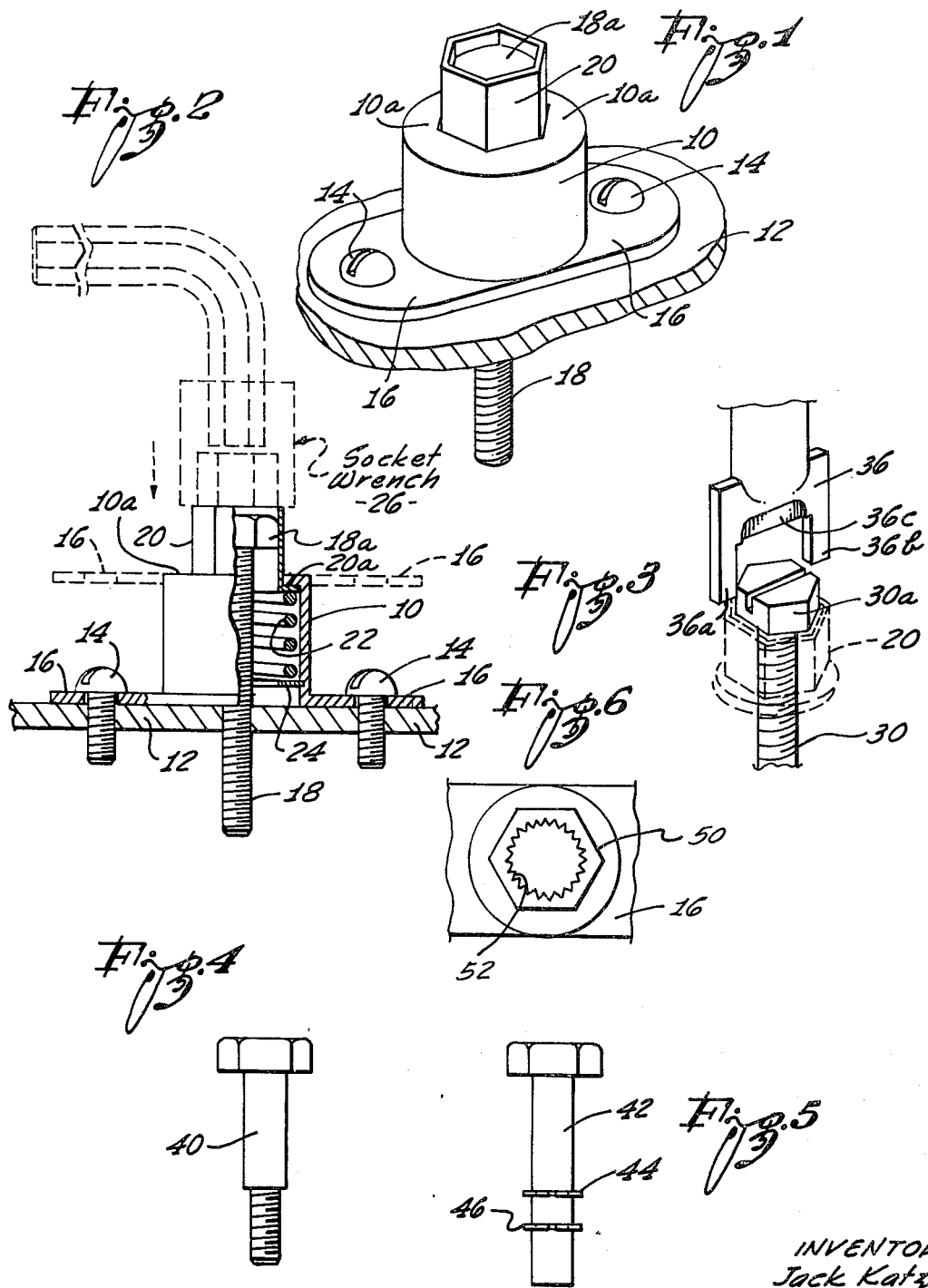

ABSTRACT OF THE DISCLOSURE

A retainer assembly for preventing rotational movement of a bolt, comprising an outer housing for attachment to a work piece and a spring biased socket element having configurations common with an aperture in the housing and the head of the bolt. The socket is movable into and out of engagement with bolt head against the bias of the spring so as to allow or prevent rotation of the bolt.

Background of the invention

The retainer assembly of the invention provides a positive means of locking a bolt, screw or shaft against angular movement, even in the presence of excessive vibrations. The retainer serves to hold the screw or bolt, for example, to permit the same positively to perform a fastening function and it assures that there will be no tendency for the bolt or screw to loosen, even under extreme vibratory conditions. The assembly also serves to lock an indicator shaft, or the like, at any predetermined angular position; and it also permits the shaft to be turned to other predetermined angular positions, upon adjustment of the retainer.

The retainer assembly of the invention has the feature in that it can be simply adjusted to a position in which the screw, bolt, or shaft is released, permitting the same to be freely turned, as mentioned above. However, there is no tendency for the assembly to be inadvertently moved to its release position, since positive action on the part of a human agency in overcoming a spring bias in the assembly is required to effect such an adjustment.

Summary of the invention

The retainer assembly of the invention includes a tubular socket which fits over the head of a screw or shaft, when the screw or shaft is in place in the supporting surface. The socket is configured to mate with the shape of the aforesaid head, so as to prevent rotation of the screw or shaft with respect to the socket, and yet to permit slidable movement of the head within the socket. The socket itself is contained in an outer tubular housing, and is mounted in the housing in a manner such that the socket may be moved longitudinally within the housing, however, relative rotational movement of the socket in the housing is prevented.

The housing, in turn, is mounted on the supporting surface. An internal resilient member is included in the housing which biases the socket towards one end of the housing, so that the socket extends beyond the end of the housing. So long as the socket is in its extended position, with respect to the housing, it surrounds and entraps the head of the bolt or shaft, thus preventing the bolt or shaft from turning in the supporting surface. However, when the socket is pushed down into the housing, against the bias of the resilient member, the head of the screw or shaft is released from the socket, so that the screw or shaft may be freely turned in the supporting surface.

Brief description of the drawings

FIGURE 1 is a perspective view of one embodiment of the improved retainer assembly of the invention, showing the assembly mounted on a supporting surface and entrapping the head of a screw which extends through the surface;

FIGURE 2 is an elevation of the assembly of FIGURE 1, partly in section to reveal the internal operating components, and also illustrating the manner in which a usual tool, such as a socket wrench, may be used to release the retainer and turn the screw;

FIGURE 3 is a somewhat schematic representation showing how the retainer assembly of the invention may be used in conjunction with a screw or other elongated member having a slotted head, and also illustrating a simple tool that may be used in conjunction with that embodiment;

FIGURE 4 is a representation of a screw which may be held against rotation by the retainer assembly of the invention;

FIGURE 5 shows a shaft which, likewise, may be held against angular movement by the retainer assembly; and FIGURE 6 shows a modification of the retainer for permitting, for example, a multiplicity of angular positions for the shaft of FIGURE 5.

Description of the preferred embodiment

As shown in FIGURES 1 and 2, the retainer assembly of the illustrated embodiment of the present invention includes an outer tubular bushing or housing 10. The tubular housing 10 is mounted on a supporting surface 12 by means, for example, of a pair of screws 14 extending through corresponding tabs 16. The tabs 16 may be affixed to the lower end of the housing 10, or integral therewith, as shown in FIGURES 1 and 2. Conversely, and as shown by the dotted lines of FIGURE 2, the tabs 16 may be affixed or formed integral with the upper end of the housing 10, so that the housing may be mounted behind the supporting surface 12, rather than in front of the surface, as shown in FIGURES 1 and 2.

In the embodiment of FIGURES 1 and 2, a screw 18 having a hexagonal head 18a is shown as extending through the supporting surface 12. The supporting surface, for example, may be a plate, and the screw 18 may be used to secure the plate to a second similar plate. In that event, the screw 18 would extend through a hole in the plate 12, and be threaded, for example, into a tapped hole in the second plate.

The retainer of the invention would then serve to retain the screw 18 firmly in place, even in the presence of excessive vibrations, by preventing any rotational movement of the screw. However, the retainer may be adjusted, as will be described, so as to release the screw and permit it to be removed from the plates.

The housing 10 has an upper rim 10a formed integral at one end thereof. The rim 10a has, for example, a hexagonal shaped opening formed in it, slidably to receive a hexagonal socket 20. The socket 20, therefore, is slidable in the tubular housing 10, yet it cannot rotate within the housing 10.

A resilient means, such as a coil spring 22, is disposed within the housing 10. One end of the resilient means bears against a snap ring 24, or other appropriate retainer means at the lower end of the housing 10. The other end of the spring bears against a rim 20a formed at the lower end of the socket 20. The action of the resilient means, such as the spring 22, is to bias the socket 20 towards the upper end of the housing 10, so that the socket 20 normally extends beyond the upper end of the housing, as best shown in FIGURES 1 and 2. The movement of the socket 20 in the housing 10 is limited by the engagement of the rim 20a of the socket with the rim 10a of the housing.

Of course, the socket 20 and the opening in the rim 10a of the housing 10 may have any other desired configuration. The sole purpose of the mating configurations of the socket 20 with the opening in the rim 10a of the housing is to prevent rotation of the socket with respect to the housing, and yet to permit slidable movement of the socket within the housing.

In the illustrated embodiment, the head 18a of the screw 18 has a hexagonal configuration to be received by the heaxagonal socket 20 in a manner such that the head is held against rotation by the socket 20, and yet the socket 20 can move longitudinally with respect to the head.

As best shown in FIGURE 2, the screw 18 is positioned in the mounting surface 12 in a manner such that its head 18a is normally positioned beyond the upper end of the housing 10 and normally received by the socket. In this position of the screw and socket, it will be appreciated that any angular movement of the screw is prevented by the retainer assembly.

However, when it is desired actually to turn the screw for removal or other purposes, it is merely necessary manually to push the socket 20 down into the housing 10, thereby releasing the head 18a. This may be accomplished, for example, by means of a usual socket wrench 26. When the socket wrench is moved down over the top of the socket 20, the lower rim of the wrench pushes the socket 20 down into the housing 10, while the hexagonal aperture in the wrench head receives the head 18a of the screw, so that the wrench may be turned to remove the screw or to tighten it.

When a screw 30 having a usual slotted head 30a is used, such as shown in the embodiment of FIGURE 3, the head may have a hexagonal shape, as shown. As before, the head 30a is normally retained in the socket 20 of the retainer. A special tool 36 may be used to remove the screw 30, or to tighten it. The screw 36 has, for example, a U-shaped configuration with a pair of tines 36a and 36b. The tool 36 also has a blade 36c formed in the upper portion, as shown. When the tool 36 is moved down on the assembly, the ends of the tines 36a and 36b engage the upper edge of the socket 20 and moves the socket down into the housing 10 and clear the head 30a of the screw 30. Then the blade 36c engages the slot in the head 30a, so that the screw 30 may be turned by the tool.

As shown in FIGURE 4, and as described above, the retainer may, for example, be used in conjunction with a fastening screw, such as the screw 40. This screw, as also described, may be used to hold two plates, or other members in an assembled condition. The retainer assembly of the invention, as described above, positively prevents any tendency for the screw 40 to turn, so that it may be securely locked and properly perform its fastening function, even in the presence of severe vibrations.

As also mentioned above, the retainer assembly of the invention can be used in conjunction with a shaft, such as the shaft 42 in FIGURE 5. The shaft, for example, may be retained on the supporting surface 12 by a pair of snap rings 44 and 46. These snap rings prevent longitudinal movement of the shaft, and yet permit rotational movement thereof. The shaft, for example, may be an indicator, or it may have other purposes. The retainer assembly then serves to hold the angular position of the shaft at any preset value.

Likewise, by appropriately shaping the head of the shaft, and the corresponding shape of the socket 20, the shaft may be turned to any predetermined angular position and locked in that position. For example, although the head is shown as hexagonal shaped in FIGURE 5, it might have a serrated shape so as to be received by the socket 50 of the retainer embodiment shown in FIGURE 6. As shown, the socket 50 has a serrated bore 52. This permits the shaft to be preset to a multiplicity of angular positions.

The invention provides, therefore, an improved retainer assembly which serves firmly and positively to hold an elongated member against rotational movement in its supporting surface, and yet which may be easily released, so as to permit free rotation of the elongated member.

What is claimed is:

1. A retainer assembly for preventing rotational movement of an elongated member, said elongated member having a body portion and having a head of a particular configuration and of a selected length and of a diameter greater than the diameter of said body portion, said retainer assembly including: an outer housing; means affixed to said outer housing for mounting said outer housing on a supporting surface; an inner socket member mounted in said outer housing and slidably therein, said socket member having a predetermined configuration with respect to the head of said elongated member so as to receive said head in a sliding relationship therewith and to prevent rotation thereof, and said housing and socket member being shaped to having mating configurations in order to prevent rotation of said socket member in said housing, and said socket member and said housing having selected lengths with respect to the length of said head of said elongated member such that said head is released and free to turn when said socket member is moved in said outer housing from a first position to a second position; and resilient means biasing said socket member to said first position.

2. The retainer assembly defined in claim 1 in which said resilient means is in the form of a coil spring mounted in said outer housing and bearing against one end of said socket member.

3. The retainer assembly defined in claim 1 in which said outer housing has a tubular configuration and includes an integral rim at one end thereof; and in which said socket member has a rim which engages said rim of said housing to limit the slidable movement of said socket member in said housing when said socket member is in said first position.

4. The retainer assembly defined in claim 1 in which said inner socket member has a hexagonal configuration and in which said outer housing has a rim with an inner hexagonal shape to mate with said socket member so as to prevent rotation of said socket member in said outer housing.

References Cited

UNITED STATES PATENTS

| | | | |
|---|---|---|---|
| 1,084,566 | 1/1914 | Strietelmeier | 151—44 |
| 1,199,684 | 9/1916 | Forbes | 151—44 |
| 2,394,666 | 2/1946 | Cloedy et al. | 151—50 |
| 2,608,114 | 8/1952 | Martin et al. | 151—44 |

FOREIGN PATENTS

| | | |
|---|---|---|
| 430,628 | 8/1911 | France. |
| 673,794 | 10/1929 | France. |
| 871,151 | 6/1961 | Great Britain. |

MARION PARSONS, Jr., *Primary Examiner.*